(12) United States Patent
Lindemann

(10) Patent No.: US 6,771,056 B1
(45) Date of Patent: Aug. 3, 2004

(54) AC CONTROLLER WITH REVERSE BLOCKING IGBT

(75) Inventor: Andreas Lindemann, Lampertheim (DE)

(73) Assignee: Ixys Corporation, Santa Clara, CA (US)

( * ) Notice: Subject to any disclaimer, the term of this patent is extended or adjusted under 35 U.S.C. 154(b) by 0 days.

(21) Appl. No.: 10/284,018

(22) Filed: Oct. 29, 2002

Related U.S. Application Data (60) Provisional application No. 60/343,743, filed on Oct. 31, 2001.

(51) Int. Cl.⁷ .............................................. H02M 5/293
(52) U.S. Cl. ........................ 323/324; 323/224; 323/239
(58) Field of Search ................................ 323/223, 224, 323/237, 239, 300, 320, 324

(56) References Cited

U.S. PATENT DOCUMENTS

| | | | | |
|---|---|---|---|---|
| 4,870,340 A | * | 9/1989 | Kral | 323/235 |
| 5,635,826 A | * | 6/1997 | Sugawara | 323/300 |
| 6,236,192 B1 | * | 5/2001 | Suzuki et al. | 323/239 |

* cited by examiner

*Primary Examiner*—Jeffrey Sterrett
(74) *Attorney, Agent, or Firm*—Townsend and Townsend and Crew LLP

(57) ABSTRACT

A method for operating an alternating-current (AC) controller system includes providing a first bi-directional switch coupled to a load and an AC power source. The first bi-directional switch is a solid-state device. The first switch is turned on in a first half-cycle of an AC cycle. The first switch is turned off in the first half-cycle of the AC cycle.

22 Claims, 5 Drawing Sheets

$T_1, T_2, T_3, T_4$-"R"IGBT

FIG. 1A

Prior Art

FIG. 1B

Prior Art

FIG. 2A

Prior Art

FIG. 2B

Prior Art

FIG. 2C

Prior Art

AC CONTROLLER WITH REVERSE BLOCKING IGBT

CROSS-REFERENCES TO RELATED APPLICATIONS

This application claims priority to U.S. Provisional Patent Application No. 60/343,743, filed on Oct. 31, 2001, which is incorporated by reference herein for all purposes.

BACKGROUND OF THE INVENTION

Figure 1A:
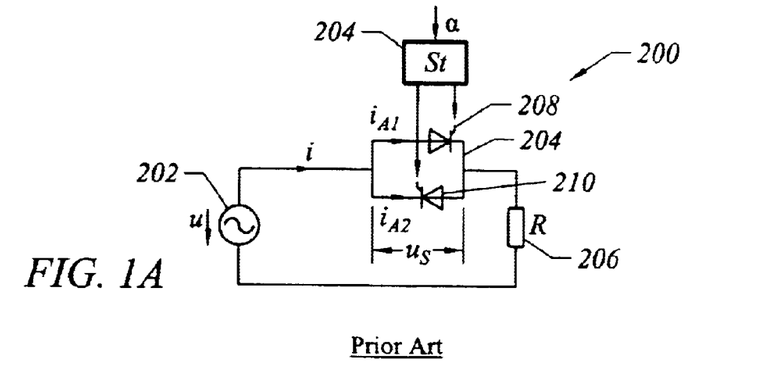
FIG. 1A shows a conventional AC controller having a SCR switch.

FIG. 1A shows a conventional AC controller 200 having a silicon control rectifier ("SCR") as the solid-state device switch. The controller 200 includes a mains or power source 202 that supplies power, a switch 202 that regulates the power, and a control circuit 204 that controls the turn on and off characteristics of the switch. A load 206 receives the power.

The switch 202 includes a first silicon control rectifier ("SCR") 208 and a second SCR 210 that are arranged in an "anti-parallel" formation to conduct currents in both directions. Like a diode, an SCR generally conducts currents in a single direction so two SCRs are provided in a reverse orientation to serve as an AC switch.

There are three basic control modes in SCR devices: (1) on/off, (2) zero-firing, and (3) phase-firing. The first mode or on/off mode is the simplest method and replicates the action of an electromechanical switch. The power is either turned on or turned off according to the commands of the control circuits 204. Generally, the device is "on" if a command signal is applied to the SCR, and the device is "off" if the command signal is removed.

The second control mode or zero-firing mode switches the SCRs on and off, but provides a proportional control capability. With this control mode, the number of "on" or "off" AC cycles is varied to maintain a steady voltage level to the load while turning the power on and off. While effective, the zero-firing is not suited for some application. The voltage applied to the load is either zero or full because zero-firing turns the SCR either completely on or off. This is not suitable for certain exotic load elements, such as, molybdenum disilicide. Molybdenum disilicide's resistance is nearly zero when cold, but it increases with temperature. A large current surge results each time the SCR is turned on from a cold state. These current surges can damage SCRs.

The third control mode or phase-firing provides infinite variable control of voltage being applied to the load, much like a light dimmer. Similar to the zero-firing, the phase firing provides timed gate pulses or command signals to the SCRs. The phase-firing mode, however, turns on each of the two SCRs in an AC switch only for a portion of the respective half-cycles.

Figure 1B:
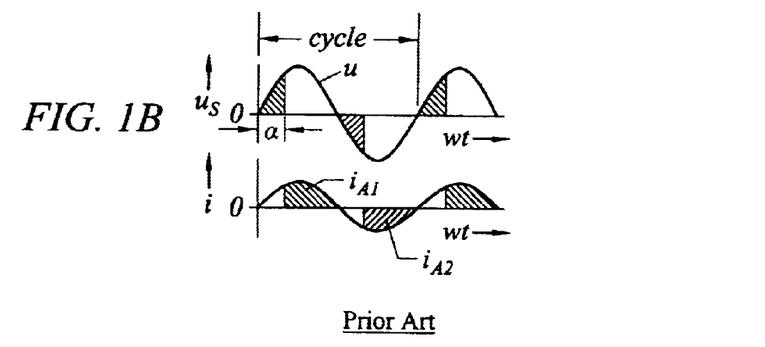
FIG. 1B shows a voltage level and current flow in the AC controller of FIG. 1A.

Referring to FIG. 1B, the SCRs are being fired on in the AC cycle at a given angle $\alpha$, as described in the current and voltage waveforms. Once fired on, as long as there is a forward-on current flow iA1 (FIG. 1A), the SCR stays on. The SCR turns off as soon as the current iA1 decreases to substantially zero current level or below the threshold current level of the SCR. As illustrated, the voltage and current waveform is a function of the firing angle $\alpha$.

Figure 2A:
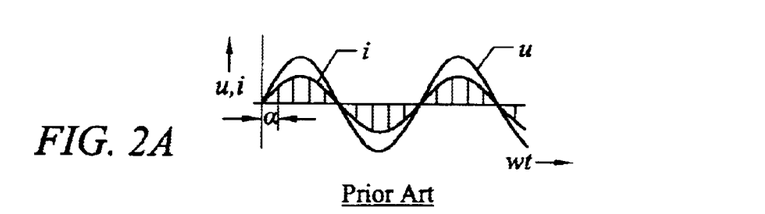
FIG. 2A shows a voltage level and current flow for a conventional AC controller coupled to a resistive load.
Figure 2B:
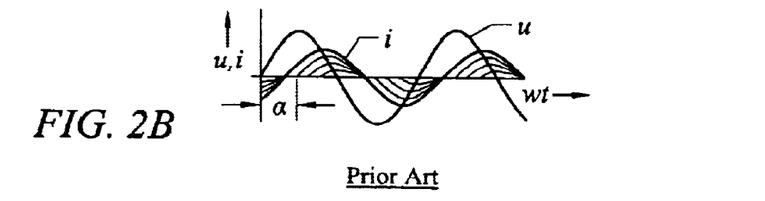
FIG. 2B shows a voltage level and current flow for a conventional AC controller coupled to a resistive-inductive load.
Figure 2C:
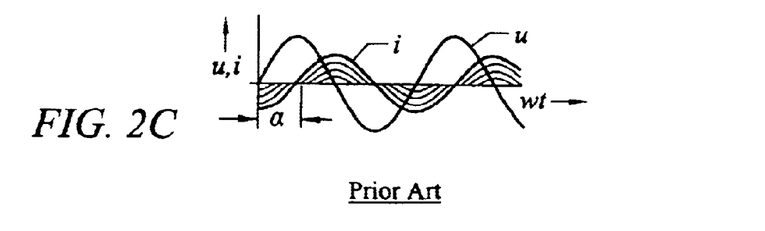
FIG. 2C shows a voltage level and current flow for a conventional AC controller coupled to an inductive load.

FIGS. 2A–2C illustrate the current and voltage waveforms of the AC controller 200 as a function of the firing angle $\alpha$ for a resistive load (FIG. 2A), for a resistive-inductive load (FIG. 2B), and inductive load (FIG. 2C).

Even at resistive loads, a firing angle $\alpha>0$, indicating that power consumption of the load is controlled by the AC controller, leads to the generation of first harmonic reactive power and of further harmonic content caused by the distortion of the current waveform. This creates high electromagnetic noise or "EMC" for the AC controller. A countermeasure step, therefore, is required to compensate the reactive power component to reduce the EMC. The current flow at firing angles $\alpha>0$, is intermittent on the mains side and on the load side. This also causes an increase of EMC in the AC controller 200.

Although the load and firing angle $\alpha$ determine the current waveform, there is no mechanism in the AC control circuit 200 to control them. The EMC generally is reduced in such circuits by adding passive filters. These added filters add to the cost, size and weight of the AC control circuits.

SUMMARY OF THE INVENTION

Embodiments of the present invention provides the capability of an AC switch to be turned on and off in any time during the AC cycle, allowing the user to apply any desirable pulse pattern to said AC switches, even turning them on and off multiple times within the AC cycle. Accordingly, inverters and converters can be developed with enhanced control features that reduce undesirable noise problems, improve dynamic response of the system to interference or to changing power demands, and improve power regulation and the efficiency of the system.

In one embodiment, a method for operating an alternating-current (AC) controller system includes providing a first bi-directional switch coupled to a load and an AC power source. The first bi-directional switch is a solid-state device. The first switch is turned on in a first half-cycle of an AC cycle. The first switch is turned off in the first half-cycle of the AC cycle.

In another embodiment, an alternating-current (AC) controller system includes a first switch including a reverse blocking insulated gate bipolar transistor ("RIGBT") coupled to a power supply to regulate a current supplied by the power supply. The first switch is configured to be turned off while the current is flowing through the first RIGBT.

In another embodiment, a method for operating an alternating-current (AC) controller system including providing an AC switch coupled to a power supply and a load. The AC switch is turned on to supply a current to the load. The AC switch is turned off while the current is flowing through the switch and being supplied to the load.

In another embodiment, an AC controller includes an AC source having a first pole and a second pole, a load having a first node and a second node, and a first bidirectional switch, a solid state device, that is coupled to the first pole of the AC source and the first node of the load. The bidirectional switch has at least one reverse blocking insulated gate bipolar transistor (IGBT).

In yet another embodiment, a multi-phase switch system includes a first AC controller including an AC source having a first pole and a second pole, a load having a first node and a second node, and a first bidirectional switch being a solid state device coupled to the first pole of the AC source and the first node of the load. The bidirectional switch has at least one reverse blocking insulated gate bipolar transistor (IGBT). The system also includes a second AC controller including a second AC source having a first pole and a second pole, a second load having a first node and a second node, and a second bidirectional switch being a solid state device coupled to the first pole of the AC source and the first node of the load. The second bidirectional switch has at least one reverse blocking IGBT.

In yet another embodiment, a method for operating an AC controller includes providing an AC source having a first pole and a second pole; providing a first load having a first node and a second node; providing a first bidirectional switch being a solid state device coupled to the first pole of the AC source and the first node of the first load, wherein the bidirectional switch has at least one reverse blocking IGBT; and controlling the first switch to adjust a power factor for optimal performance of the AC controller with respect to the AC source.

DETAILED DESCRIPTION OF THE PREFERRED EMBODIMENTS

In one embodiment, an AC switch or controller includes a reverse blocking insulated gate bipolar transistor ("reverse blocking IGBT," or "RIGBT").

Figure 3A:
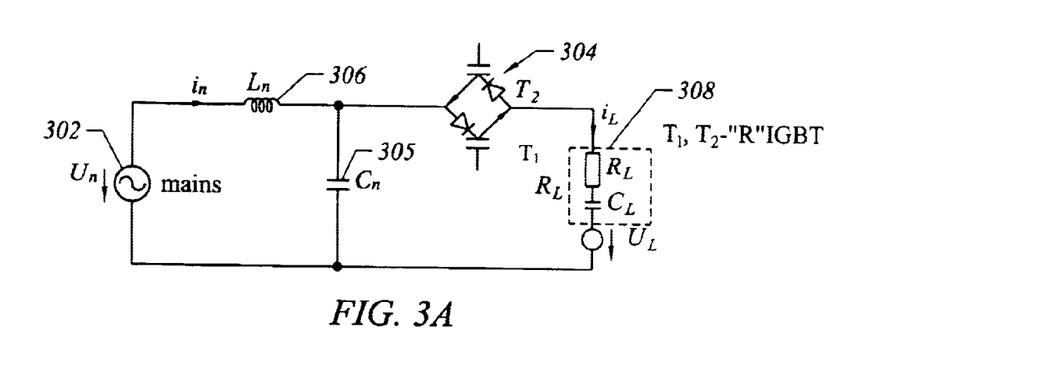
FIG. 3A shows an AC controller having a bi-directional switch according to one embodiment of the present invention.

FIG. 3A illustrates an AC controller 300 configured for resistive loads and/or resistive-capacitive loads without the need of an additional load voltage source (the load should not behave like an inductance). The AC controller 300 includes a power source or mains 302, a switch 304, a capacitor 305 (Cn), and an inductor 306. A RC load 308 receives the currents from the mains 302 according to the controls of the switch 304. The switch 304 is a solid device, e.g., RIGBT, that is capable of handling currents in two directions unlike the SCRs in the controller 100 of the conventional technology. In one embodiment, the switch 304 includes a first RIGBT T1 and a second RIGBT T2 that are arranged in an anti-parallel arrangement. The RIGBTs T1 and T2 may have a single or a plurality of dice in a parallel arrangement. The capacitor 305 and the inductor 306 comprise an input filter. The capacitor 305 suppresses voltage spikes across the switch 304 during turn offs. The inductor 306 facilitates reduction in reactive power consumption and current ripple.

Figure 3B:
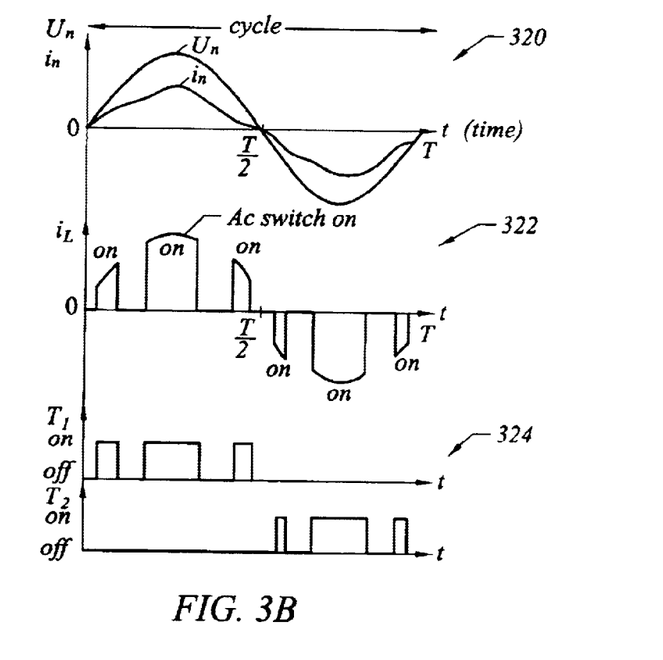
FIG. 3B shows a voltage level and current flows associated with the AC controller of FIG. 3A.

FIG. 3B shows a mode of operation of the AC controller 300 accordingly to one embodiment of the present invention. The AC controller 300 having the RIGBT switch 304 provides various control schemes for optimal operation because the RIGBT switch can be turned on or off at any point during the AC power cycle. A graph 320 illustrates the voltage level and current flow with respect to a given time, i.e., one cycle. A graph 322 illustrates the turn-on and turn-off states of the switch 304 according to the current level. A graph 324 illustrates the turn-on and turn-off pulse patterns-corresponding to the graph 322. The first RIGBT T1 is turn on in the first half-cycle, and the second RIGBT T2 is turn on in the second half-cycle. As shown, the switch is turned on and off many times in each half AC cycle.

First, the AC controller 300 provides capability of adjusting the power factor of the mains 302. The power factor is the ratio of active power to apparent power. Generally, the power factor is deemed to be cos ($\theta$) for sinusoidal voltage and current, such as alternating current (AC), when the phase difference between the voltage and current is $\theta$. Accordingly, the power factor should be close to one for optimal performance of the circuit. In the AC controller 300, the power factor can be adjusted to be substantially one, which corresponds to resistive load behavior since the switch can be turn on or off any time during the current cycle (see, FIG. 3b). Furthermore, it may be adjusted differently, which offers the possibility to actively compensate reactive power generated elsewhere in the grid.

Second, the current flowing through the mains 300 may be controlled to be continuous, driven by the inductance of the mains or the inductor 306 connected in series with the mains 302 to avoid EMC emission problems. In one embodiment, another inductor may be serially connected to the inductor 306.

Third, the AC controller 300 can be controlled to vary circuit conditions faster since the switch 304, which is self commutated, can be turned off at any time, whenever it is necessary. Accordingly, there is no need to wait for a zero current condition to effectuate the turn off the AC controller 300, as is the case with the AC controller 200 with an SCR.

Figure 4A:
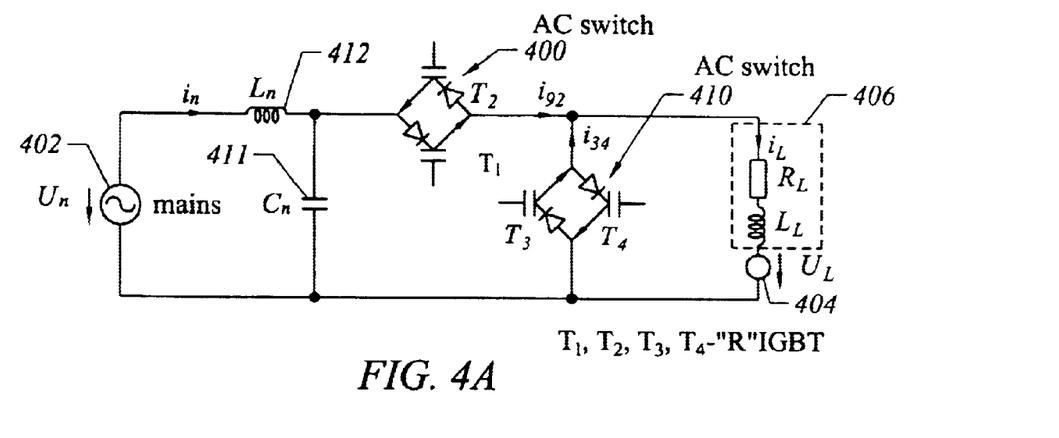
FIG. 4A shows an AC controller having a bi-directional switch according to one embodiment of the present invention.

FIG. 4A shows an AC controller 400 configured for loads with an inductive behavior. The AC controller 400 includes a first voltage source or mains 402, a second voltage source or mains 404, a first RIGBT switch 408, a second RIGBT switch 410, a capacitor 411 (Cn) and an inductor 412. A load 406 receives the currents supplied by the mains 402 according to the controls of the first switch. The load 406 includes a resistor and an inductor, as shown in FIG. 4A. The first mains 402 provides greater power than the second mains 404 according to one embodiment of the present invention. In another embodiment, the first mains 402 and the second mains 402 provide substantially equal power. In yet another embodiment, the second mains 404 provides greater power than the first mains 402. The first switch 408 includes a first RIGBT T1 and a second RIGBT T2, and the second switch 410 includes a third RIGBT T3 and a fourth RIGBT T4 according to one embodiment of the present invention. The second switch 410 provides a free wheeling path to prevent the first switch 408 from being damaged during the turn off of the inductive current. The capacitor 411 and the inductor 412 comprise an input filter. The capacitor 411 suppresses voltage spikes across the switch 408 during turn offs. The inductor 412 facilitates reduction in reactive power consumption and current ripple.

Figure 4B:
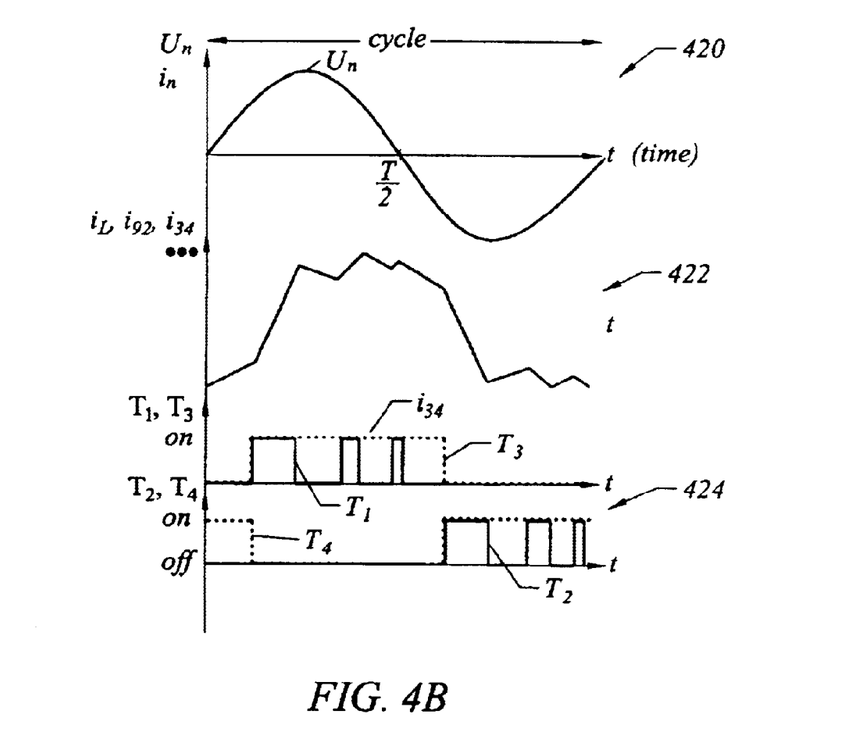
FIG. 4B shows a voltage level and current flows associated with the AC controller of FIG. 4A.
Figure 5:
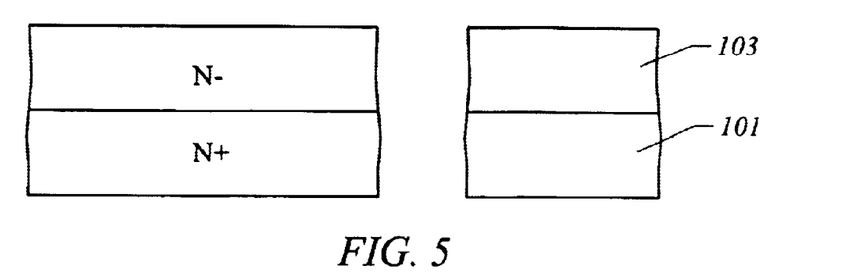
FIGS. 5–8 are schematic views illustrating the fabrication of a reverse blocking IGBT used in the AC switch according to one embodiment of the present invention.

FIG. 4B shows a control method of the AC controller 400 according to one embodiment of the present invention. A graph 420 illustrates a voltage level and current flow with respect to a given time, i.e., one cycle. A graph 422 illustrates first, second, and third current flows in the AC controller 400. The first current i12 flows from the first switch 408 to the load 406. The second current iL flows through the load 406. The third current i34 flows from the second switch 410 to a node provided between the first switch 408 and the load 406. A graph 424 shows the turn-on and turn-off states of the first and second switches 408 and 410. As shown, the switch is turned on and off many times in each half AC cycle.

In one embodiment, the first RIGBT T1 of the first switch 408 and the third RIGBT T3 of the second switch 410 are turn together. The first RIGBT T1 is turned on in a pulse pattern during much of the first half of the current cycle, while the third RIGBT T3 remains turned on during this period. On the other hand, the second RIGBT T2 is turned on in a pulse pattern during much of the second half of the current cycle, while the fourth RIGBT T4 remains turned on during this period.

The AC controller 400 provides forward conduction capability to the unidirectional free wheeling RGIBTs T3 or T4 (the switch 410) as long as it might carry load current according to the latter's polarity. The reverse blocking IGBT functions as a unidirectional free wheeling switch because it will maintain a reverse blocking capability while the gate is turned on.

Referring to FIGS. 4A and 4B, the operation of the AC controller 400 is provided as follows. The operation with the first switch 408 continuously closed corresponds to an SCR AC controller with "firing angle" $\alpha=0$. The AC controller 400 including the reverse blocking IGBT provides additional controllability. An unused part of mains voltage-time-area may be used for 'earlier' magnetization or de-magnetization of the load inductance, respectively. This capability contributes to a reduction of first harmonic reactive power. Thus the control towards lower load currents does not lead to an increase of reactive power consumption as in the conventional AC controller. Rather, it instead may be used to reduce the reactive power.

As already explained above, the mains current may be controlled to be continuous, driven by mains inductance or the series connection of mains inductance and the inductor 412 to prevent EMC emission problems. The load current flow may also be continuous with the same effect.

The AC controller 400 can be turned off any time because the first switch 408 can be turned off at any time during the cycle, as desired. That is, there is no need to wait for zero current turn off as in the conventional SCR based circuits.

FIGS. 5–8 illustrate a method of fabrication for a reverse blocking IGBT used in the AC switch according to one embodiment of the present invention. The present fabrication method begins with a semiconductor substrate such as an N+ type substrate 101 and the like of FIG. 5. It should be noted that the present fabrication method relies upon an N+ type substrate, but may also use other types of substrates. The N+ type substrate includes an N– type layer 103 defined thereon by way of standard chemical vapor deposition (CVD) techniques and the like. The N– type layer includes an N type impurity such as phosphorous or the like at a concentration ranging from about $10^{13}$ atoms/cm$^3$ to $10^{14}$ atoms/cm$^3$, and is preferably at about $4\times10^{13}$ atoms/cm$^3$ for preferred bipolar transistor operation. Relative to the N– type layer, the N+ type semiconductor substrate includes an N type impurity such as phosphorous or the like at a concentration ranging from about $10^{15}$ atoms/cm$^3$ to about $10^{19}$ atoms/cm$^3$, and is preferably at about $10^{17}$ atoms/cm$^3$. Of course, other concentrations may also be provided depending upon the particular application.

Figure 6:
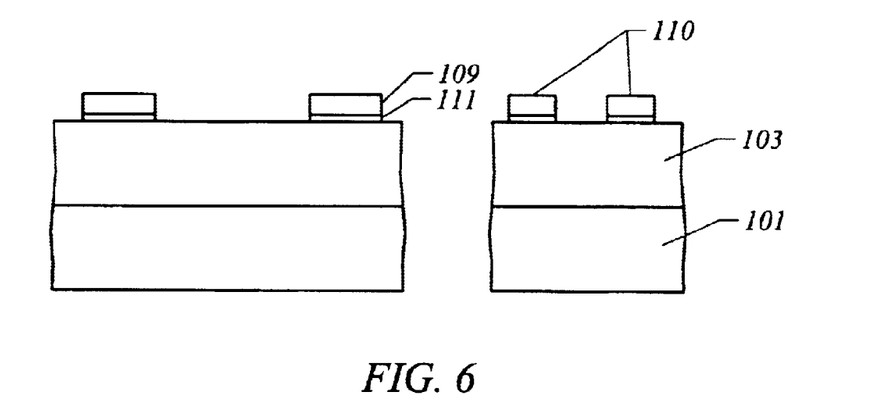

Active IGBT devices define onto the N– type layer by way of, for example, a double diffused MOS (DMOS) technique and others. The DMOS technique defines a gate electrode layer 109 overlying a thin layer of high quality oxide 111. The gate electrode layer is typical made of polysilicon and the like, which is preferably doped with an N type dopant material for conductivity. Steps of masking and etching define the gate electrodes (G) overlying the thin high quality oxide formed over the N– type layer. Also shown are field plate layers formed overlying a portion of the N– type layer.

Figure 7:
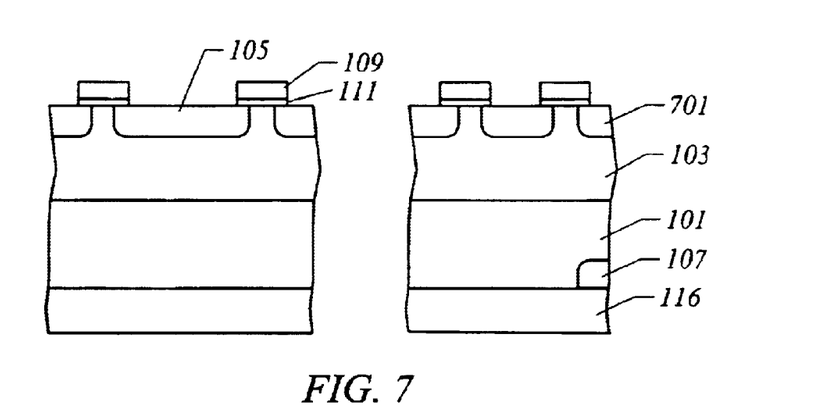

An implant step(s) forms P type well regions 105 in the N– type layer as illustrated by FIG. 7. Each P type well region is preferably a P/P+ type well or the like, and is defined between each of the gate electrodes. The P type well region includes a boron impurity concentration ranging from about $10^{14}$ atoms/cm$^3$ to about $10^{18}$ atoms/cm$^3$, and is preferably at about $10^{16}$ atoms/cm$^3$. The implant step also forms P type guard ring region(s) 115. The P type guard ring regions are defined at an outer periphery of the active cell region for the purpose of preventing the conductive region of forming outside the main junction region. Thus, the P type guard ring regions preserve the high voltage characteristics of the present IGBT device. A P type region 116 defining a drain region (D) is formed overlying the backside of the N+ type semiconductor substrate in an implant step. The P type region includes a boron impurity concentration ranging from about $10^{15}$ atoms/cm$^3$ to about $10^{18}$ atoms/cm$^3$, and is preferably at about $10^{18}$ atoms/cm$^3$. A subsequent diffusion step creates the P type drain region, which can range in depth from about 50 microns to about 300 microns, and is preferably at about 100 microns for a 600 volt to 3,000 volt IGBT device. The P type impurity for the P type well region, the P type guard ring region, and the P type drain region is preferably boron or the like.

A P type region 701 is also defined at the scribe line of the integrated circuit chip. A P type region 107 is also defined from the backside of the wafer. Both of the P type regions are defined by way of sputtering, implantation or the like using an impurity with a higher mobility than, for example, the P type well region, the P type guard ring region, and the P type drain region. By way of a subsequent diffusion step(s), the P type regions 701, 107 diffuse faster than the P type impurities of, for example, the well region, the guard ring region, and the drain region. The faster diffusion rate allows the P type regions to connect to each other 117. This forms a continuous P type "frame" (or diffusion region) around the periphery of the integrated circuit, thereby eliminating the N+/P+ junction region of the conventional IGBT device. The P type impurity with the higher mobility is preferably aluminum or the like. A step of selective sputtering coats selected regions of the integrated circuit with the aluminum for subsequent thermal diffusion or the like.

Figure 8:
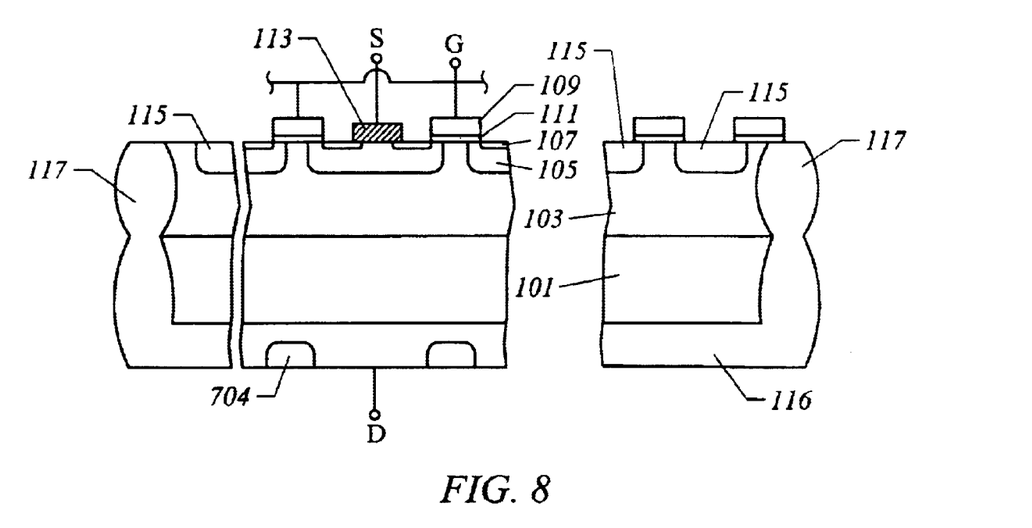

A source implant step forms an N type source region(s) 107 (S) within the periphery of the P type well region(s) 105. The source implant is preferably an arsenic implant where the arsenic is at a concentration ranging from about $10^{17}$ atoms/cm$^3$ to about $10^{20}$ atoms/cm$^3$, and is preferably at about $3\times10^{19}$ atoms/cm$^3$. A metallization layer typically aluminum or the like defines a source metallization layer. As shown, the source (S), the gate (G), and the drain (D) define the IGBT according to the present invention.

Optionally, an N+ type dopant 704 such as phosphorous or the like forms selected N+type regions in the drain region. The N+ type regions modify the present IGBT device performance for special switching and forward voltage drop characteristics. The N+ type regions include a phosphorous impurity at a concentration ranging from about $10^{16}$ atoms/$cm^3$ to about $10^{19}$ atoms/$cm^3$, and are preferably at about $7 \times 10^{18}$ atoms/$cm^3$.

The above detailed descriptions are provided to illustrate specific embodiments of the present invention and are not intended to be limiting. For example, the AC controller described herein can be readily applied to three phase systems also with the similar principles. Those skilled in the art can easily modify the description provided above in connection with a single-phase system to more than one phase systems. Numerous modifications and variations within the scope of the present invention are possible. Accordingly, the present invention is defined by the appended claims.

What is claimed is:

1. A method for operating an alternating-current (AC) controller system, comprising:

providing a first bidirectional switch coupled to a load and an AC power source, the first bi-directional switch being a solid-state device, the first switch having a first reverse blocking insulating gate bipolar transistor (RIGBT) and a second RIGBT in an anti-parallel arrangement;

turning on the first switch in a first half-cycle of an AC cycle, the AC cycle including the first half-cycle and a second-half cycle; and turning off the first switch in the first half-cycle of the AC cycle, wherein the first RIGBT is configured to be turned on during the first half-cycle and not to be turned on during the second half-cycle, and the second RIGBT is configured not to be turned on during the first half-cycle and turned on during the second half-cycle.

2. The method of claim 1, further comprising:

providing a second bidirectional switch being of a solid-state device to provide a free wheeling path, the second switch including a third RIGBT and a fourth RIGBT in an anti-parallel arrangement, wherein each of the first, second, third, and fourth RIGBTs is able to handle currents in two directions, wherein the third RIGBT is configured to be turned on during the first half-cycle and not to be turned on during the second half-cycle, and the fourth RIGBT is configured not to be turned on during the first half-cycle and turned on during the second half-cycle.

3. The method of claim 1, further comprising:

turning off or turning on the first switch at any time during an AC cycle.

4. The method of claim 1, further comprising:

controlling the first switch to adjust a power factor of the power source to be substantially one for optimal performance of the AC controller.

5. The method of claim 1, further comprising:

controlling the first switch to adjust a power factor of the power source to compensate reactive power generated by a node in the AC controller, the node being at a different location than the power source, wherein the power factor of the power source is adjusted to be different from being substantially one.

6. An alternating-current (AC) controller system, comprising:

a first switch including a first reverse blocking insulated gate bipolar transistor ("RIGBT") and a second RIGBT that are coupled to a power supply to regulate a current supplied by the power supply, the first switch being configured to be turned off while the current is flowing through the first RIGBT, the first and second RIGBTs being in an anti-parallel arrangement;

an inductor coupled to the power supply and the first switch to reduce at least capacitive reactive power consumption; and a second switch including a third RIGBT and a fourth RIGBT and coupled to the first switch to provide a free wheeling path, the third and fourth RIGBTs being in an anti-parallel arrangement, wherein the first and third RIGBTs arc configured to be turned on during a first half-cycle and not to be turned on during a second half-cycle, the first and second half-cycles together being an AC cycle, wherein the second and fourth RIGBTs are configured not to be turned on during a first half-cycle and to be turned on during a second half-cycle.

7. The AC controller of claim 6, wherein the first and second switches include two RIGBTs, respectively.

8. The AC controller of claim 7, wherein the two RIGBTs in the first switch are oriented in reverse directions.

9. A method for operating an alternating-current (AC) controller system, comprising:

providing an AC switch coupled to a power supply and a load;

turning on the AC switch to supply a current to the load; and turning off the AC switch while the current is flowing through the switch and being supplied to the load; and reducing at least capacitive reactive power consumption using an inductor coupled to the power supply, wherein the AC switch essentially comprises a first reverse blocking insulated gate bipolar transistor (RIGBT) and a second RIGBT, wherein the first RIGBT is configured to be turned on during a first half-cycle and not to be turned on during a second half-cycle, and the second RIGBT is configured not to be turned on during a first half-cycle and turned on during a second half-cycle.

10. The method of claim 9, wherein the AC controller system is an AC controller.

11. An AC controller, comprising:

an AC source having a first pole and a second pole;

a load having a first node and a second node; and a first bidirectional switch being a solid state device coupled to the first pole of the AC source and the first node of the load, wherein the bidirectional switch has a first reverse blocking insulated gate bipolar transistor (RIGBT) and a second RIGBT that are arranged in an anti-parallel arrangement, wherein the first RIGBT and second RIGBT are configured to turned on at different half-cycles, wherein the first and second RIGBTs are configured to handle currents in two different directions.

12. The AC controller of claim 11, further comprising:

a second bidirectional switch having third and fourth RIGBTs in anti-parallel arrangement, the second switch controlling a current path in parallel to the load.

13. The AC controller of claim 12, further comprising:

a capacitor provided between the first and second poles of the AC source.

14. The AC controller of claim 13, further comprising:

an inductor provided between the AC source and the capacitor to reduce capacitive reactive power consumption.

15. The AC controller of claim 11, further comprising:

a capacitor provided between the first and second poles of the AC source.

16. The AC controller of claim 11, wherein the first switch is configured to be turned on and off at any time during an AC cycle.

17. A method for operating an AC controller, comprising:

providing an AC source having a first pole and a second pole;

providing a first load having a first node and a second node;

providing a first bidirectional switch being a solid state device coupled to the first pole of the AC source and the first node of the first load, wherein the bidirectional switch has first and second reverse blocking IGBTs that are configured to be turned on at different half-cycles; and controlling the first switch to adjust a power factor for optimal performance of the AC controller with respect to the AC source, wherein the first and second reverse blocking IGBTs are configured to handle currents in two directions.

18. The method of claim 17, further comprising:

controlling the first switch to adjust a power factor to be substantially one for optimal performance of the AC controller.

19. The method of claim 18, further comprising:

providing a second load coupled to the AC source; and controlling the first switch to adjust a power factor to differ from one to compensate for reactive power consumption of the second load, or harmonic distortion of the second load, or both.

20. The method of claim 19, further comprising:

providing a second bidirectional switch having at least one reverse blocking IGBT, the second switch controlling a current path in parallel to the load.

21. The method of claim 20, further comprising:

turning on the first and the second bidirectional switches at different times to prevent the polarity of current from short-circuiting the AC source.

22. The method of claim 21, further comprising:

turning off the first and the second bidirectional switches at different times for the polarity of current delivered by an inductive load.

* * * * *